Figure 1:
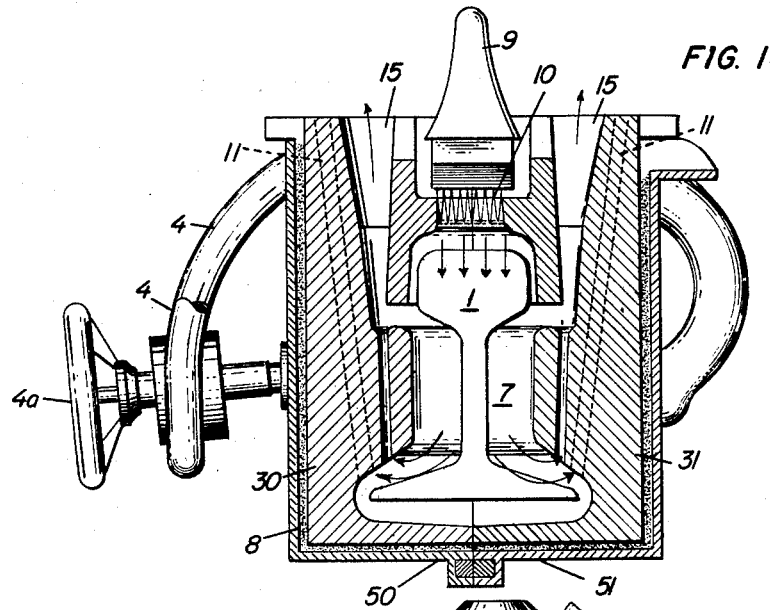

April 19, 1960     W. AHLERT     2,932,863
METHOD AND APPARATUS FOR WELDING
Filed Aug. 15, 1956     2 Sheets-Sheet 1

United States Patent Office 2,932,863
Patented Apr. 19, 1960

2,932,863

METHOD AND APPARATUS FOR WELDING

Wilhelm Ahlert, Essen, Germany, assignor to Electro Thermit G.m.b.H., Essen, Germany, a company of Germany Application August 15, 1956, Serial No. 604,234

12 Claims. (Cl. 22—58)

This invention relates to a method of welding workpieces, more particularly rails, by the intermediate aluminothermic casting process.

The method of welding metal sections and more particularly rails by the aluminothermic intermediate casting process is well known. The process is performed by introducing aluminothermically produced steel between the preheated ends of rails that are to be welded and which have been enclosed in a mould, so that the metal in the rails fuses and welds with the aluminothermic steel without giving rise to pores.

The hitherto customary and known method of intermediate casting involves enclosing the ends of two rails in a divided or multi-part mould consisting of refractory moulding sand. By means of a clamping device the individual parts of the mould are pressed together and into contact with the rails.

By means of a blower a mixture of propane (or butane, petrol, benzene, and the like) and air, or possibly with the admixture of oxygen is blown before being ignited through a channel into the interior of the mould and then burned inside the mould. The combustion gases escape through the risers and other openings in the mould. After preheating the rail ends to be welded, and after drying and heating the mould to red heat the blower is removed and the channel closed by means of a plug.

In a crucible accurately aligned above the mould the aluminothermic welding material is reacted, whereupon the aluminothermically produced steel is allowed to flow out by the removal of the plugging pin at the bottom of a crucible. The steel flows into a pot-shaped recess in the upper part of the mould and through the two risers or through the gates which are separate from the risers.

The liquid slag produced in the aluminothermic process follows the steel out of a crucible and is usually collected in the chamber at the top of the mould.

A few minutes after the aluminothermic casting process has been completed the mould is removed and the risers and weld beads cut off while they are still red hot. This completes the welding operation.

The performance of this known procedure requires that particular care should be exercised in the preparation of the mould as well as during the pre-heating and casting operations. Hitherto it has been the exclusive practice to produce the mould in situ from refractory green sand tamped down over a pattern. The sand used must satisfy definite conditions in regard to refractoriness, clay substance and moisture content, distribution of grain size and gas-permeability. Attempts at pre-drying the mould were unsuccessful because when pressing the mould onto the rails cracks appeared which have led to escape of the aluminothermic steel.

In order to achieve uniformity in pre-heating the composition of the fuel is of primary importance. Experience has shown that only fuels which ignite slowly, which have a high flash point, and a low temperature of combustion, can be employed. Fuels such as hydrogen or acetylene, that is to say fuels with a low igniting temperature and a high combustion temperature, are not suitable for the process, whether mixed with air or with oxygen.

The subsequent plugging of the blower channel with a plug prior to the aluminothermic casting operation causes loss of time. While this is being done the pre-heated rails may cool undesirably. Moreover, during the subsequent casting procedure contact between the liquid steel and the end of the generally cold plug may give rise to the formation of pores in the weld.

It has now been found that it is possible, by employing what is called the high-speed welding technique, to appreciably shorten the time required for producing an intermediately cast weld by modifying and simplifying the equipment, and by changing the method of pre-heating as well as the normal course of the welding process.

According to the invention the moulds produced by tamping in situ are replaced by two or multi-part moulds pre-fabricated at any convenient place from refractory materials for instance from fine river sand and water glass by the carbon dioxide solidification process, dried at high temperatures, or by firing for instance fireclay or magnesite, the moulds being tamped down or pressed in batches, either by hand or mechanically, to suit particular profiles.

Casting moulds produced for instance by the carbon dioxide solidification process are bedded, with the interposition of a pliable cushioning material such as a mouldable green sand, asbestos or glass wool, into sheet metal or cast steel casting boxes in such a manner that the pliable substance is located between the walls of the box and the mould. By providing this cushion the moulds may be pressed sufficiently tightly into contact with the rails it is intended to weld. If cracks should occur the cushioning material behind the moulds prevents the aluminothermic steel from escaping. The backs of the casting moulds can be protected, according to the invention, by means of a glazing or other water-repellent. An alternative possibility of insulating the moulds against moisture, according to the invention, consists in enclosing them in an auxiliary box which exactly fits round the mould and consists of thin sheet steel or any other desired material, before the moulds are placed into the casting boxes. This auxiliary box holds the parts of the mould together and at the same time, when using a moist cushioning material, it provides a protection against the penetration of water. When the casting process has been completed the auxiliary box is removed together with the casting box and can then be repeatedly used again like the casting box.

To enable the batch-produced moulds prepared for instance by the carbon dioxide solidification process to be used on deviating sections, for instance on worn rails, they are divided, according to the invention, at the head of the rails. They can then be fitted to conform with the wear of the rail head and their dimensions suitably modified by using a rasp or by rubbing them down with emery.

Two or multi-part moulds consisting of refractory materials, such as highly fired fireclay, have considerable mechanical cohesion and can be pressed on to the rail without the use of the above described casting and auxiliary boxes and without incurring a risk of cracking the mould.

According to the invention, the highly fired mould, that is to say its halves or parts are provided with grooves or elevations or bevelled edges and these are filled in the known manner with any convenient sealing means such as a mouldable green sand, refractory cement, or the like, to provide a tight joint between the mould and the rail. By applying or inserting a pliant asbestos cord a seal can likewise be created.

Refractory moulds consisting preferably of two corresponding similar parts cannot be subsequently fitted and adapted to the shape of the rail as above described because their abrasive resistance is too high. According to the invention, for welding rails with worn heads, the upwardly open mould is partly plugged with a refractory material or with laterally supported match bars which slide into specially provided grooves or recesses in the mould in such a manner as to close the mould above the worn surface of the rail. According to the amount of wear the match bars slide down to a greater or lesser extent until they come into contact with the running surface of the rail. The match bars are finally sealed from the outside with moist refractory adherent sand.

The clamping device for the mould, as hitherto used and hereinabove mentioned, consists of several parts. Its manipulation is wasteful of time and is generally a two-handed job. According to the invention, this clamping device for the mould can be replaced by a simplified device that can be handled by one single workman. Two different types of clamps are provided and the one or the other used according to whether the moulds are of the kind produced by the carbon dioxide solidification or some other process or whether they are highly fired, refractory moulds, similar to stoneware and consisting for instance of fireclay.

The clamping device for moulds made by the carbon dioxide solidification or other process is of one-piece construction with an elastically yielding bridge member. The clamp bears against one half of the casting box with the auxiliary box and the mould inside with one point, whereas it bears with two points against the other half so that the two halves can be easily and quickly pressed against the rail by means of a handwheel. The pliable backing cushion between the near wall of the casting box and the mould evenly distributes the load transmitted through the single point to all the surfaces of the mould that are in contact with the rails.

The clamping tool for casting moulds consisting of a refractory material, such as for instance fireclay, consists of two separate, symmetrical, and independent parts, each part pressing one half of the mould against the rails it is intended to weld. To prevent the single or multiple-part moulds from bursting during the pre-heating or casting stage sheet metal supporting members are interposed. These supporting members distribute the applied load over a major part of the external surface of the mould.

Each part of the clamping device is attached to the rail for instance by means of a saddle cap which embraces the head of the rail and is held in position by screws, a wedge, or like means. On the side of the saddle cap there is provided a pivoted bracket which can be swung down in front of one half of the mould. By means of a pressure screw or the like on the end of the pivoted bracket the supporting member together with the mould can then be pressed against the rail. The two moulds may be pressed on to the rail consecutively, so that one man can perform all the work necessary in preparing for the welding operation. On the saddle caps the two parts of the clamping device carry cylindrical or arbitrarily formed projections upon which either the holder for the burner or the bracket for the crucible can be mounted.

It has further been found, and this constitutes a further essential feature of the invention, that the rail ends that are to be aluminothermically welded can be very briefly, sufficiently, uniformly, and in every respect satisfactorily pre-heated when using an acetylene-oxygen mixture or other fuel-oxygen or fuel-air mixture, if the pre-heating flame is introduced from above through the riser or risers that extend in the mold above the head of the rail. It is preferred in this connection to use burners of the spray nozzle type, the exit nozzles of which are arranged in rows in conformity with the section of the riser channels.

This method of pre-heating according to the present invention is particularly suitable when employed in conjunction with pre-fabricated moulds consisting for instance of two or more parts. As careful tests have disclosed the time required for pre-heating is then reduced to less than half that normally required in this stage. A further advantage is that when pre-heating has been accomplished no channels need be plugged because the mouths of all the channels are located at the top of the mould.

In the present novel method the casting operation is performed with the help of a pouring pot lined with a refractory material and provided with pouring orifices or a spout, the pot being placed between the reaction crucible and the mould and serving to conduct the aluminothermically produced steel into the entry gates. The provision of the pouring pot enables the crucible to be prepared and the crucible contents reacted before the pre-heating operation has been completed. Consequently, none of the heat introduced into the casting mould by the preheating process is lost.

The pouring pot may be attached to the clamping device by any convenient means or it may be secured to the abovedescribed supporting member for holding the mould. Furthermore, it is an advantage to replace the pouring pot by a simple, shallow, refractory trough that can be batch-produced inexpensively. When this becomes useless it is easily replaced.

For accelerating the welding procedure the slag which follows the aluminothermic steel is immediately deflected after passing through the pouring pot into a slag pot attached in some way to the welding equipment and immediately removed with the slag that has collected therein.

The removal of the risers and of the upper and lateral weld beads on the rail head, an operation which in the past had to be done by hand, may be replaced by a mechanical grinding operation which takes only a few minutes to perform if the riser above the rail head is reduced in length to only a few millimetres. According to the invention this can be done by closing by means of a preferably pre-heated match bar the upper orifice in the mould required for the performance of the pre-heating operation and also serving as a riser, immediately before the aluminothermic steel is cast, that is to say after the burner has been removed, the said match bar being so shaped that on the head of the rail the entering aluminothermic steel can create only a small bead of a few millimetres section but nevertheless sufficient to assure a good weld of the rail joint.

The lateral beads on the rail head are likewise reduced by diminishing the size of the relative recesses when making the moulds. It has been found that despite these modifications pre-heating is not impaired and does not take any longer to complete. The purpose of the now closed head riser, for instance to allow the gases to escape from the mould and small fragments of the mould to be swept out and so forth, is then fulfilled by the entry gates which are located in each half of the mould, and which are then conveniently taken through the entire half of the mould. These two channels are arranged midway between the two air vents and they end flush with the head of the rail. Moreover, a lateral exit to the lower edge of the rail head branches off from this channel.

The method according to the invention will now be more particularly described with reference to the drawings.

Two pre-fabricated dry mould sections 30 and 31 (as shown in Figure 1) and which may have been produced by the carbon dioxide solidification process or some other process, are placed together then surrounded with a cushioning 8 of pliable material and then placed into the two casting box halves 50 and 51. By means of the clamp 4 the casting box halves 50 and 51 are pressed against the rail ends 1 and 2 when a handwheel 4a is operated so as to apply inward pressure. The pliable cushioning 8 between the parts 30 and 31 of the mould and the rear wall of the casting box 50—51 permits the load to be evenly distributed. The joint of the mould at the rail is then sealed in the customary manner with a wet green sand or with clay.

The burner 9 is introduced through the riser 10 located above the head of the rail and extending across the entire width of the rail head. The burner is mounted on a tripod 16. Two legs 16a engage lugs on the clamp 4, whereas the third leg 16b rests on the rail. This will ensure that the center of the burner is always in alignment with the center of the riser 10. Precisely the hottest zone of the flame will then impinge upon the head of the rail. The web of the rail will merely be in contact with a narrow edge of the flame. The entire jet widens in the downward direction and impinges upon the foot of the rail at a temperature that has already decreased. Consequently the flame is zonally well adapted to the heat requirements of the rail section. The combustion gases leave the mould through channels 11 and 15.

Figure 2:
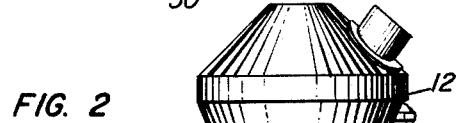
Figure 3:
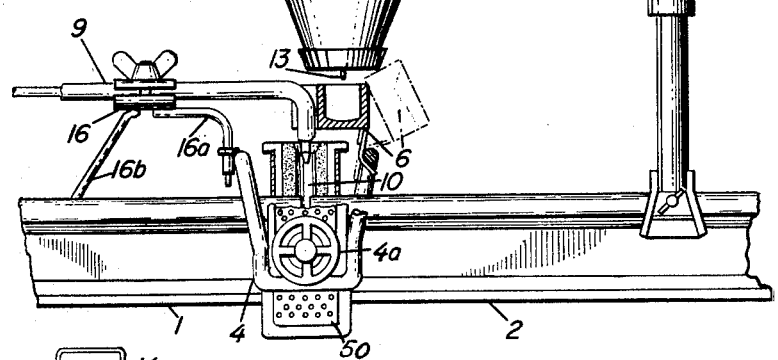
Figure 3:
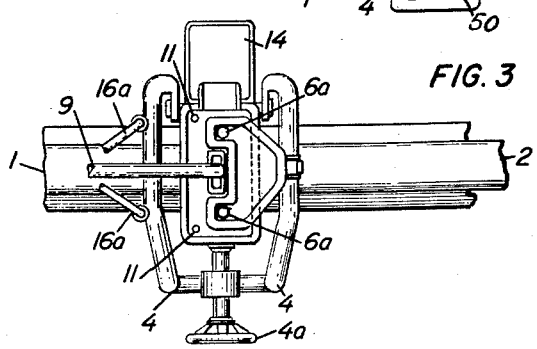
Figure 4:
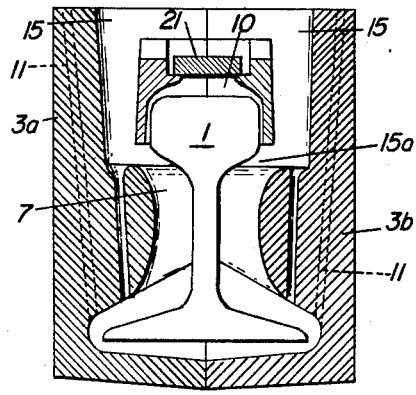
Figure 5:
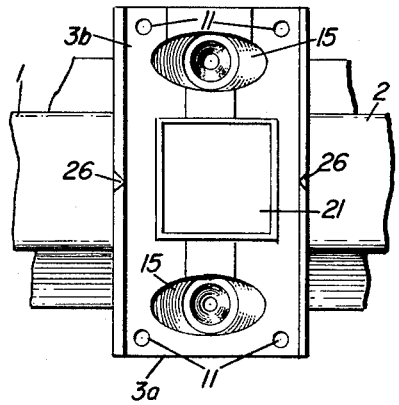
Figure 6:
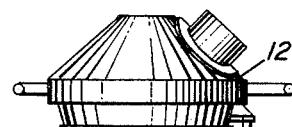
Figure 7:
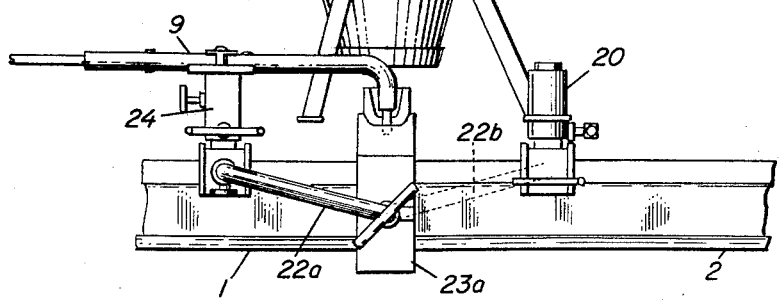

Shortly before the pre-heating process has been completed the pouring pot 6 is moved from its pre-heating position (shown in Figure 2 in dotted lines) into the casting position. The burner 9 is removed while the aluminothermic reaction takes place in the crucible 12. By pulling out the pin 13 which plugs the crucible the aluminothermic steel is allowed to issue from the crucible in the conventional manner. The liquid steel runs into the pouring pot 6 and thence through the two orifices 6a (see Figure 3) and the gates 15 into the interior 7 of the mould 30—31. The slag is drained away on one side into the slag box 14 which is likewise suspended from the casting box 5 and is immediately removed. The mould 30—31 is then dismantled and the weld finished in the customary manner.

The method according to the present invention, as performed when using highly fired moulds, consisting for instance of fireclay, will be more particularly described with reference to Figures 4–7. Before placing the mould halves 3a and 3b into position the two parts 22a and 22b of the clamp are so attached to the head of the rail that the ends of the two pivoted brackets that have been lowered into the horizontal alignment have their bearing points or surfaces approximately level with the rail joint. After adjustment, the brackets are swung upwards about their fulcrums on the saddle caps. The two halves of the moulds 3a and 3b can then be loosely inserted into the two retaining plates 23a and 23b and together with the latter pressed either simultaneously or consecutively into contact with the rail ends 1 and 2 that are to be welded, by bringing down the pivoted brackets of the clamp members 22a and 22b and tightening the clamping screws. The halves of the mould are then sealed along the joints either by filling the sealing grooves or bevelled edges 26 or by inserting an asbestos cord. Members consisting of a refractory material, or match bars 21, are slipped into keyways or conveniently sectioned grooves or recesses inside the mould above the head of the rail and pushed down to a greater or lesser extent between the halves of the mould in conformity with the amount of wear of the rail.

The holder 24 for the burner is then pushed on to the saddle cap of the clamping member 22a or 22b and secured by means of set screws or other suitable means. Similarly the bracket 20 for the prepared reaction crucible is secured to the other clamping member and the crucible aligned in readiness for welding. The pouring trough 25 is placed between the crucible and the mould.

As soon as the pre-heating stage is over the orifice 10 into which the burner had been inserted is likewise plugged with a pre-heated refractory body or match bar 21 in such a manner that a cavity only a few millimetres high remains between the rail surface and the plug. The quantity of aluminothermic steel that fills this gap is, however, just sufficient to ensure satisfactory fusing of the material of the rail.

The aluminothermic steel flows down the pouring trough 25 laterally through one of the two gates 15 into the mould, part of the molten metal entering the mould at the foot of the rail and the other part through the branch duct 15a at the lower edge of the head of the rail. The entrance at the foot of the rail may be omitted. The steel which now rises in the mould also fills the very narrow cavity above the rail head between the inserted body or match bar 21 and the top of the rail head without however creating a riser of substantial proportions for subsequent removal. The lateral weld beads may be mechanically ground off after a short period of cooling. However, it is quite possible for a train to run over a weld before the joint has been cleaned up.

The method according to the invention is particularly suitable for welding rails. Prefabricated moulds, a shorter period of pre-heating, a simplification and reduction in the weight of the gear, all combine to reduce by more than half the time otherwise required for the production of a weld by the intermediate casting process, and the novel method therefore permits such welding operations to be performed during very short periods in which the traffic is blocked. At the same time the novel method economises in labour and effort.

I claim:

1. In an apparatus for the aluminothermic welding of workpieces such as rails by the intermediate casting technique which includes (a) a multipart fragile mold adapted to surround a portion of the workpiece, (b) a clamping means to hold the mold in place, (c) a means for preheating the area of the workpiece which is to be welded, (d) a means for flowing aluminothermic steel into the interior of the mold after the workpiece has been properly preheated, the improvement in said mold which comprises (e) a metallic cover around the exterior of said mold surfaces, (f) a cushioning material between the exterior of said mold and the interior of said metallic cover, whereby the mold is better protected from breakage during placement of the fragile mold around the workpiece.

2. An apparatus according to claim 1 wherein said cushioning material is selected from the group consisting of glass wool and asbestos.

3. An apparatus according to claim 1 wherein the contacting surfaces of said molds are provided with sealing grooves.

4. An apparatus according to claim 1 wherein said clamping means simultaneously serves as a means for supporting the reaction crucible for the aluminothermic steel and as a means for holding the preheating means (c).

5. An apparatus according to claim 1 wherein the riser space above the head of the rail is wholly or partly filled at the end of the preheating step by a conveniently shaped refractory filling body.

6. An apparatus according to claim 2 wherein said cushioning material is asbestos.

7. An apparatus according to claim 2 wherein said cushioning material is glass wool.

8. An apparatus according to claim 2 wherein the exterior of said mold is provided with a water-repellent coating.

9. An apparatus according to claim 4 wherein said clamping means is one integral piece.

10. An apparatus according to claim 4 wherein said clamping means comprises two separate symmetrical parts.

11. An apparatus according to claim 5 wherein said filling body is adapted to be held in lateral guideways.

12. A process for the aluminothermal welding of workpieces such as rails by the intermediate casting technique, which comprises:

(a) surrounding the portions of the workpieces to be welded with a multipart fragile mold, (b) clamping said multipart fragile mold into place around said workpieces, (c) preheating the portions of the workpieces which are to be welded by limiting the path of preheating flames and gases to a direction which is downwardly from the top area to the bottom area of said workpieces and then causing the preheating flames and gases to reverse their path and flow upwardly from the bottom portion past the top portion of said workpieces, (d) causing all of said preheating gases to exit at a point located above the upper level of said workpieces, (e) terminating the flow of preheating flames, (f) introducing a molten metal into said preheated multipart fragile mold and into the area between said workpieces so as to effect a suitable welding of said workpieces, and (g) allowing said molten metal to cool and then removing said mold.

References Cited in the file of this patent

UNITED STATES PATENTS

| | | |
|---|---|---|
| Re. 13,050 | Goldschmidt | Dec. 7, 1925 |
| 426,375 | Grasser | Apr. 22, 1890 |
| 665,865 | Baker | Jan. 15, 1901 |
| 1,168,061 | Deppeler | Jan. 11, 1916 |
| 1,562,227 | Goldschmidt | Nov. 17, 1925 |
| 1,757,148 | Spilsbury | May 6, 1930 |
| 2,283,611 | Neiman | May 19, 1942 |
| 2,328,479 | Mathieu | Aug. 31, 1943 |
| 2,380,945 | Collins | Aug. 7, 1945 |
| 2,790,218 | Kohl et al. | Apr. 30, 1957 |

FOREIGN PATENTS

| | | |
|---|---|---|
| 575,734 | Great Britain | Mar. 4, 1946 |